United States Patent
Baptist et al.

(10) Patent No.: US 10,146,621 B2
(45) Date of Patent: *Dec. 4, 2018

(54) CHAINING COMPUTES IN A DISTRIBUTED COMPUTING SYSTEM

(71) Applicant: International Business Machines Corporation, Armonk, NY (US)

(72) Inventors: Andrew D. Baptist, Mt. Pleasant, WI (US); Greg R. Dhuse, Chicago, IL (US); S. Christopher Gladwin, Chicago, IL (US); Gary W. Grube, Barrington Hills, IL (US); Wesley B. Leggette, Chicago, IL (US); Manish Motwani, Chicago, IL (US); Jason K. Resch, Chicago, IL (US); Thomas F. Shirley, Jr., Wauwatosa, WI (US); Ilya Volvovski, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/405,130

(22) Filed: Jan. 12, 2017

(65) Prior Publication Data

US 2017/0123912 A1 May 4, 2017

Related U.S. Application Data

(63) Continuation-in-part of application No. 13/865,641, filed on Apr. 18, 2013, which is a continuation-in-part
(Continued)

(51) Int. Cl.
*G06F 9/50* (2006.01)
*G06F 11/10* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC ...... G06F 3/0619; G06F 3/067; G06F 3/0604; G06F 3/0655; G06F 11/1402;
(Continued)

(56) References Cited

U.S. PATENT DOCUMENTS

| 4,092,732 A | 5/1978 | Ouchi |
| 5,454,101 A | 9/1995 | MacKay et al. |

(Continued)

FOREIGN PATENT DOCUMENTS

EP 1903750 A1 3/2008

OTHER PUBLICATIONS

Shamir; How to Share a Secret; Communications of the ACM; vol. 22, No. 11; Nov. 1979; pp. 612-613.
(Continued)

*Primary Examiner* — Tae K Kim
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device receives distributed computing data and a distributed computing request that includes a trigger pattern and then identifies a portion of the distributed computing data. The computing device then executes a distributed computing task on the portion of the distributed
(Continued)

computing data based on the distributed computing request to generate a partial result, determines whether the partial result compares favorably to the trigger pattern of the distributed computing request, and then either dispersed error encodes the partial result to generate sets of encoded data slices (EDSs) or facilitates execution of further processing.

20 Claims, 10 Drawing Sheets

Related U.S. Application Data of application No. 13/707,490, filed on Dec. 6, 2012, now Pat. No. 9,304,857.

(60) Provisional application No. 61/569,387, filed on Dec. 12, 2011.

(51) Int. Cl.
| | |
|---|---|
| *G06F 3/06* | (2006.01) |
| *H04L 29/08* | (2006.01) |
| *G06F 11/14* | (2006.01) |
| *G06F 11/20* | (2006.01) |
| *G06F 21/60* | (2013.01) |
| *G06F 21/62* | (2013.01) |
| *H03M 13/37* | (2006.01) |
| *H04L 29/06* | (2006.01) |
| *H03M 13/09* | (2006.01) |
| *H03M 13/15* | (2006.01) |

(52) U.S. Cl.
CPC .......... *G06F 3/0619* (2013.01); *G06F 9/5077* (2013.01); *G06F 9/5083* (2013.01); *G06F 11/1451* (2013.01); *G06F 11/2058* (2013.01); *G06F 11/2069* (2013.01); *G06F 21/602* (2013.01); *G06F 21/6218* (2013.01); *H03M 13/3761* (2013.01); *H04L 63/0428* (2013.01); *H04L 63/06* (2013.01); *H04L 67/10* (2013.01); *H04L 67/1017* (2013.01); *H04L 67/1097* (2013.01); *G06F 2211/1028* (2013.01); *H03M 13/09* (2013.01); *H03M 13/1515* (2013.01); *H04L 63/08* (2013.01); *H04L 63/10* (2013.01)

(58) Field of Classification Search
CPC ............. G06F 11/1076; G06F 11/1092; G06F 11/1096; G06F 2212/263; H04L 67/1097; H04L 67/1095
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,415,118 B2 * | 8/2016 | Batt ...................... | A61K 45/06 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0163507 A1 | 8/2003 | Chang et al. | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Saran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0071988 A1 | 3/2011 | Resch et al. | |
| 2011/0107113 A1 * | 5/2011 | Resch ..................... | H04L 12/00 |
| | | | 713/193 |
| 2012/0137091 A1 * | 5/2012 | Grube ................. | G06F 12/0638 |
| | | | 711/158 |
| 2012/0137095 A1 * | 5/2012 | Grube ................. | G06F 12/0638 |
| | | | 711/162 |
| 2013/0151670 A1 * | 6/2013 | Leggette ................. | H04L 67/10 |
| | | | 709/219 |
| 2013/0232503 A1 * | 9/2013 | Volvovski ........... | G06F 11/1044 |
| | | | 718/104 |
| 2013/0238900 A1 * | 9/2013 | Leggette ............. | H04L 63/0428 |
| | | | 713/165 |

(56) References Cited

U.S. PATENT DOCUMENTS

2013/0305060 A9\* 11/2013 Resch .................... H04L 12/00
713/193

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
International Business Machines; Response to EP communication dated May 26, 2017; Nov. 1, 2017; 5 pgs.
Communication pursuant to Article 94(3) EPC; EP Application No. 12856963.9; dated May 16, 2017; 9 pages.

\* cited by examiner

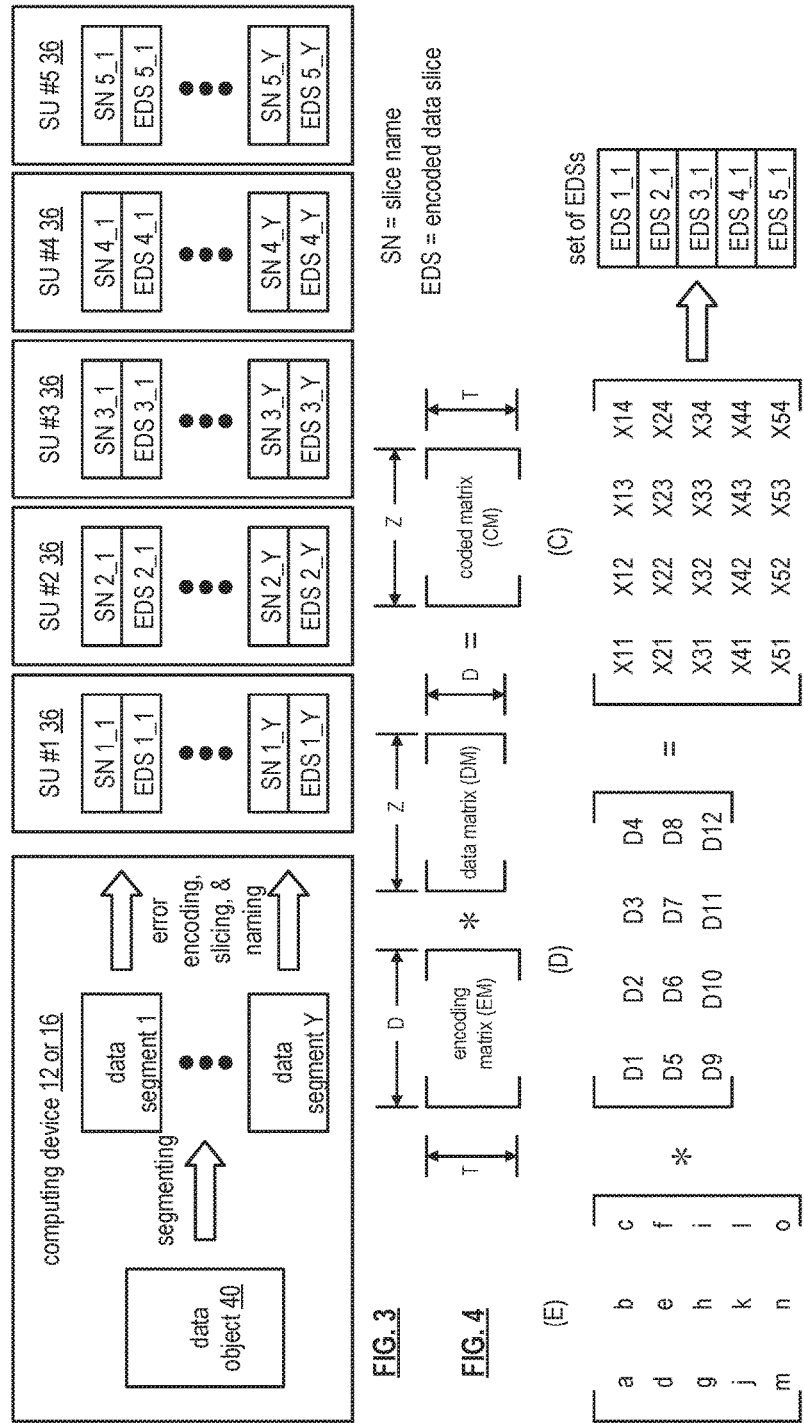

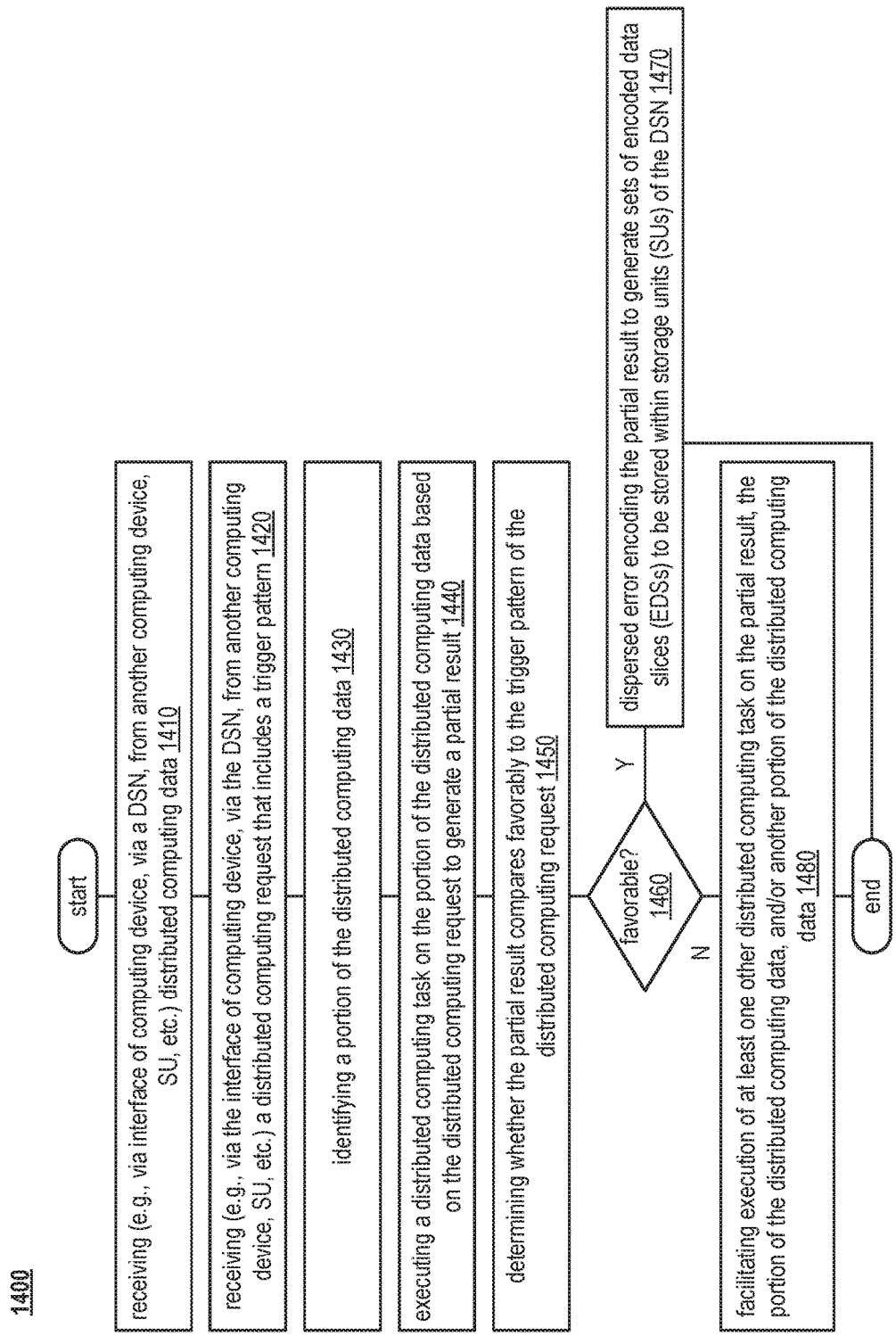

CHAINING COMPUTES IN A DISTRIBUTED COMPUTING SYSTEM

CROSS REFERENCE TO RELATED PATENTS

The present U.S. Utility Patent Application also claims priority pursuant to 35 U.S.C. § 120, as a continuation-in-part (CIP) of U.S. Utility patent application Ser. No. 13/865,641, entitled "DISPERSED STORAGE NETWORK SECURE HIERARCHICAL FILE DIRECTORY," filed Apr. 18, 2013, pending, which claims priority pursuant to 35 U.S.C. § 120, as a continuation-in-part (CIP) of U.S. Utility patent application Ser. No. 13/707,490, entitled "RETRIEVING DATA FROM A DISTRIBUTED STORAGE NETWORK," filed Dec. 6, 2012, now issued as U.S. Pat. No. 9,304,857 on Apr. 5, 2016, which claims priority pursuant to 35 U.S.C. § 119(e) to U.S. Provisional Application No. 61/569,387, entitled "Distributed storage and task processing," filed Dec. 12, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Processing and execution of operations within data storage systems can be challenging and problematic. For example, the prior art does not provide adequate means by which execution of operations within data storage systems can be performed effectively and efficiently.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 14 is a diagram illustrating an embodiment of a method for execution by one or more computing devices in accordance with the present invention.

DETAILED DESCRIPTION OF THE INVENTION

Figure 1:
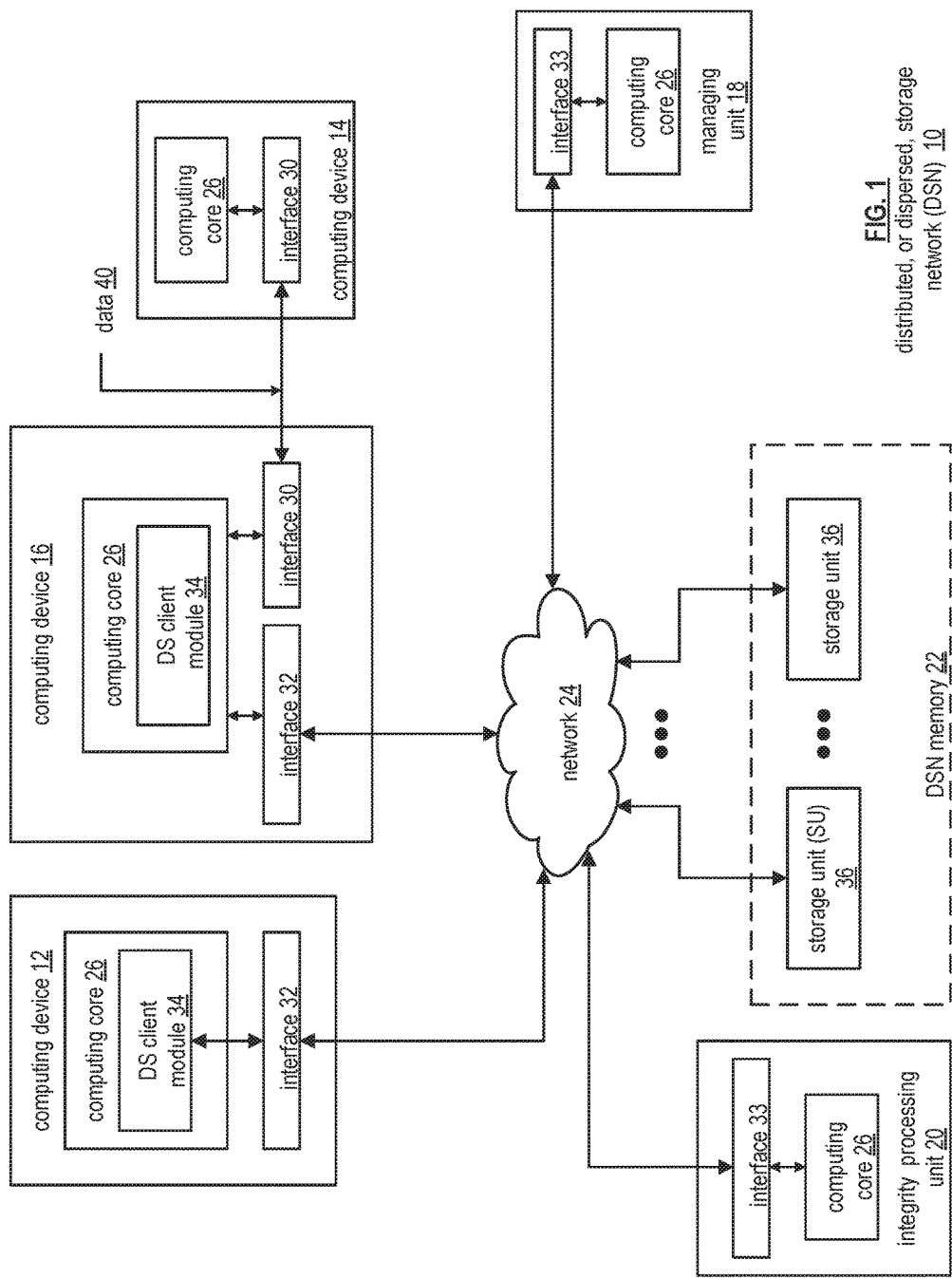
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
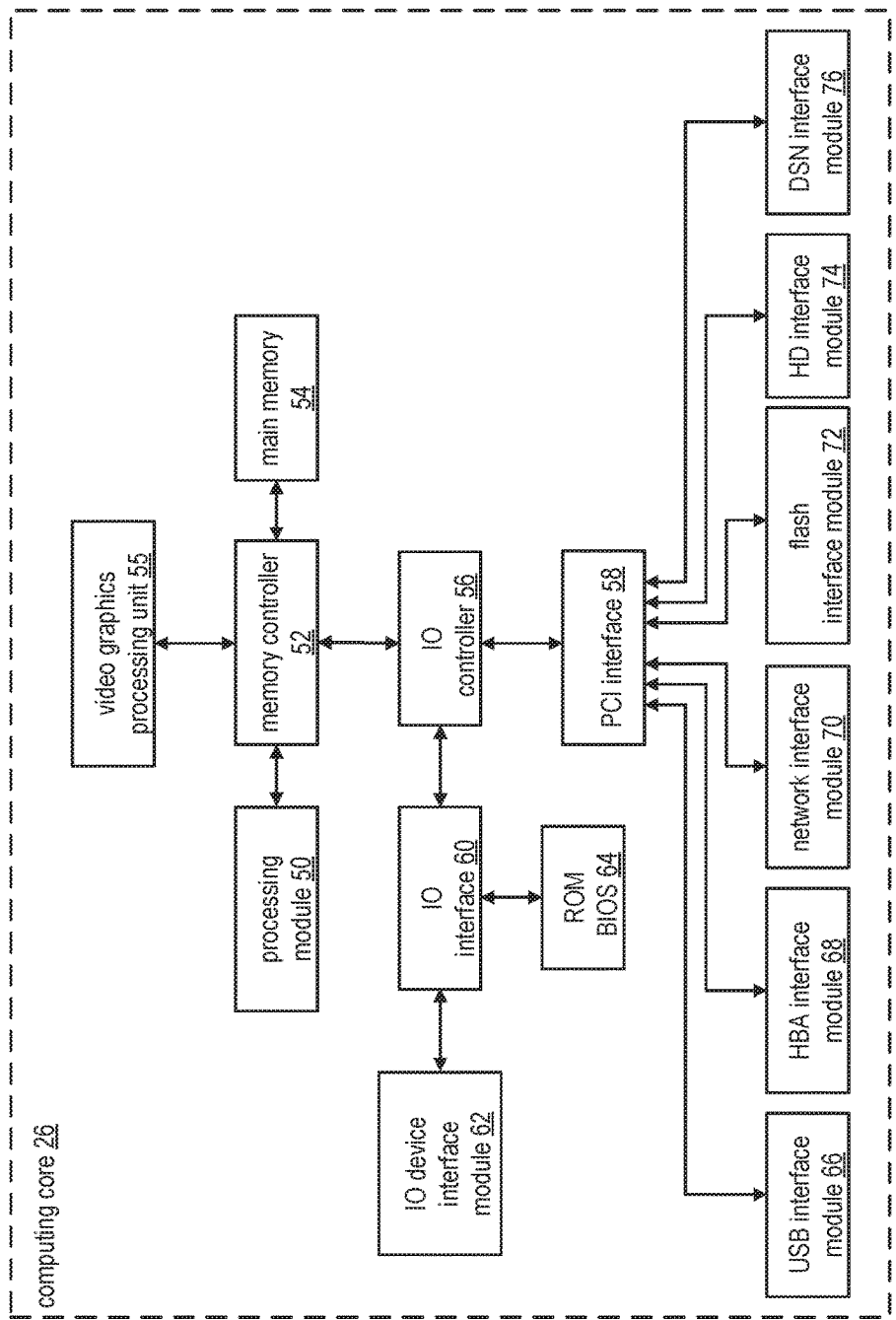
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
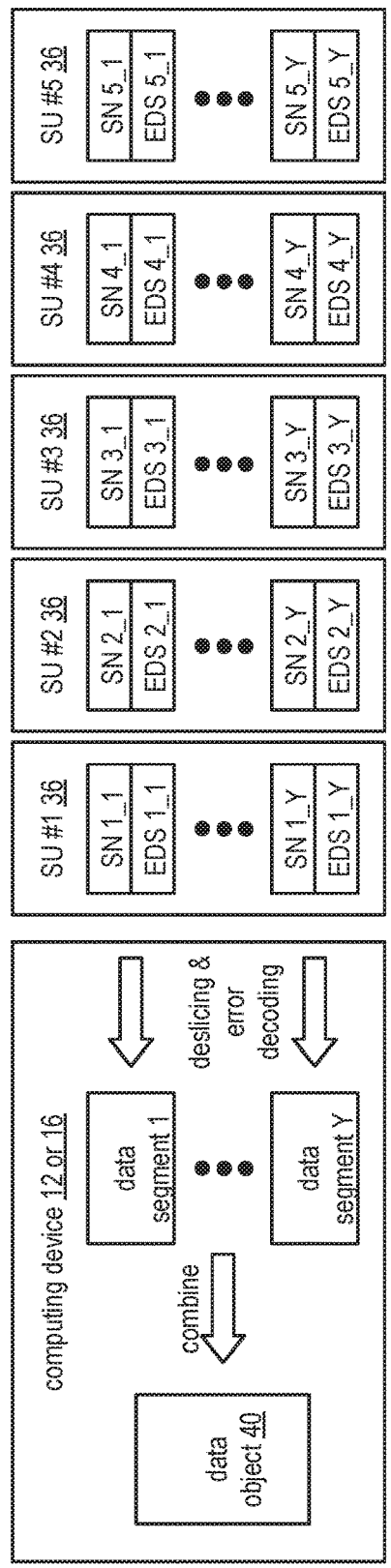
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
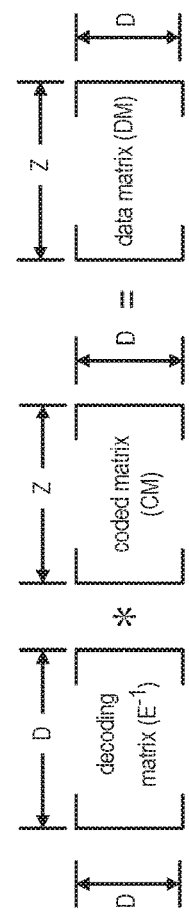
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In an example of operation and implementation, a computing device (e.g., computing device 12 or 16) includes an interface (e.g., interface 30 or 32) configured to interface and communicate with a dispersed or distributed storage network (DSN), a memory that stores operational instructions, and a processing module operably coupled to the interface and memory such that the processing module, when operable within the computing device based on the operational instructions, is configured to perform various operations.

For example, the computing device (e.g., computing device 12 or 16) is configured to receive distributed computing data via the DSN. Then, the computing device is configured to receive a distributed computing request that includes a trigger pattern via the DSN. The computing device is also configured to identify a portion of the distributed computing data. The computing device is then configured to execute a distributed computing task on the portion of the distributed computing data based on the distributed computing request to generate a partial result. The computing device is also configured to determine whether the partial result compares favorably to the trigger pattern of the distributed computing request.

When the partial result compares favorably to the trigger pattern of the distributed computing request, the computing device is configured to dispersed error encode (DSE) the partial result to generate sets of encoded data slices (EDSs) to be stored within a plurality of storage units (SUs) of the DSN.

Alternatively, when the partial result compares unfavorably to the trigger pattern of the distributed computing request, the computing device is configured to facilitate execution of at least one other distributed computing task on the partial result, the portion of the distributed computing data, and/or another portion of the distributed computing data via the DSN.

In some examples, when the partial result compares favorably to the trigger pattern of the distributed computing request, the computing device is configured to segment the partial result to generate a plurality of partial result segments, dispersed error encode (DSE) the plurality of partial result segments to generate sets of EDSs, and then distributedly store the sets of EDSs within the plurality of SUs of the DSN. Note that a decode threshold number of EDSs are needed to recover a partial result segment of the plurality of partial result segments, and a read threshold number of EDSs provides for reconstruction of the partial result segment of the plurality of partial result segments. Also, note that a write threshold number of EDSs provides for a successful transfer of a set of the sets of the EDSs from a first at least one location in the DSN to a second at least one location in the DSN.

In even other examples, when the partial result compares unfavorably to the trigger pattern of the distributed computing request, the computing device is configured to determine the at least one other distributed computing task and then determine processing parameters of the partial result, the portion of the distributed computing data, and/or another portion of the distributed computing data based on a number of a plurality of other computing devices to perform execution of at least one other distributed computing task on the partial result, the portion of the distributed computing data, and/or another portion of the distributed computing data. The computing device is then configured to determine task partitioning based on the plurality of other computing devices and the processing parameters. Then, the computing device is configured to process the partial result, the portion of the distributed computing data, and/or another portion of the distributed computing data based on processing parameters to generate data slice groupings and partition the at least one other distributed computing task based on the task partitioning to generate partial tasks. Then, the computing device is then configured to transmit (e.g., via an interface of the computing device) the partial tasks and the data slice groupings respectively to the plurality of other computing devices to be executed respectively by the plurality of other computing devices to generate a plurality of processed partial results.

In addition, in some examples, when the partial result compares unfavorably to the trigger pattern of the distributed computing request, the computing device is configured to select the other distributed computing task on the partial result, the portion of the distributed computing data, and/or another portion of the distributed computing data based on the partial result, a partial result threshold, a comparison of the partial result of the partial result threshold, an aspect of the partial result, a trigger associated with the aspect of the partial result, and/or a comparison of the aspect of the partial result with the trigger associated with the aspect of the partial result.

In addition, in even other examples, the computing device is configured to determine whether the partial result compares favorably to the trigger pattern of the distributed computing request by comparing the partial result to a partial result threshold and/or determining whether the partial result includes a keyword search aspect.

Note that the computing device may be located at a first premises that is remotely located from at least one SU of a plurality of SUs within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

A dispersed or distributed storage network (DSN) module includes a plurality of distributed storage and/or task (DST) execution units 36 (e.g., storage units (SUs), computing devices, etc.) that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
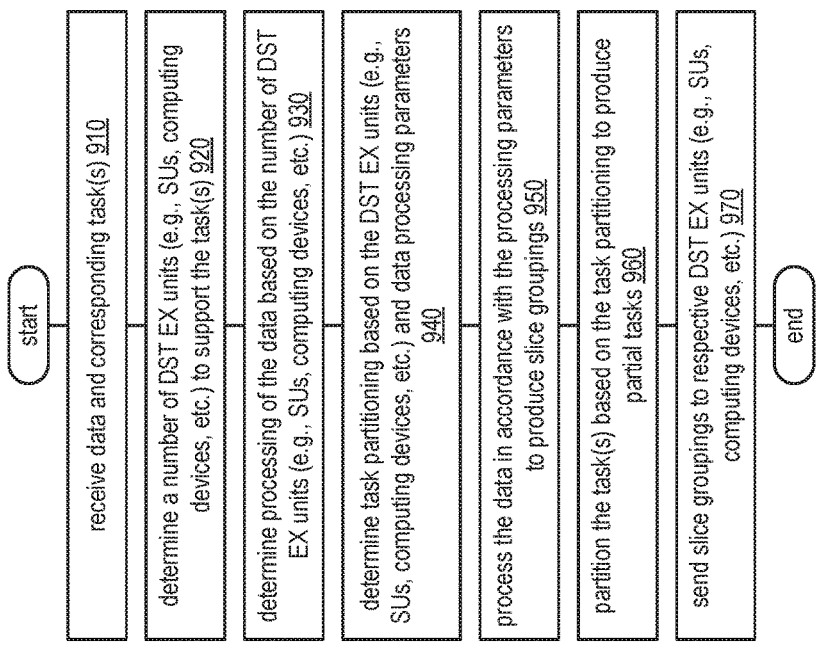
FIG. 9 is a logic diagram of an example of a method for outbound DST processing in accordance with the present invention.

FIG. 9 is a logic diagram of an example of a method 900 for outbound DST processing that begins at a step 910 with the DST client module receiving data and one or more corresponding tasks. The method 900 continues at a step 920 with the DST client module determining a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method 900 continues at a step 930 with the DST client module determining processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error information, slicing information, and/or per slice security information. The slice grouping information includes information regarding how to arrange the encoded data slices into groups for the selected DST units. As a specific example, if, the DST client module determines that five DST units are needed to support the task, then it determines that the error encoding parameters include a pillar with the five and a decode threshold of three.

The method 900 continues at a step 940 with the DST client module determining task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DST execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.), and/or any information germane to executing one or more tasks.

The method 900 continues at a step 950 with the DST client module processing the data in accordance with the processing parameters to produce slice groupings. The method 900 continues at a step 960 with the DST client module partitioning the task based on the task partitioning information to produce a set of partial tasks. The method 900 continues at a step 970 with the DST client module sending the slice groupings and the corresponding partial tasks to the selected DST units.

Figure 10:
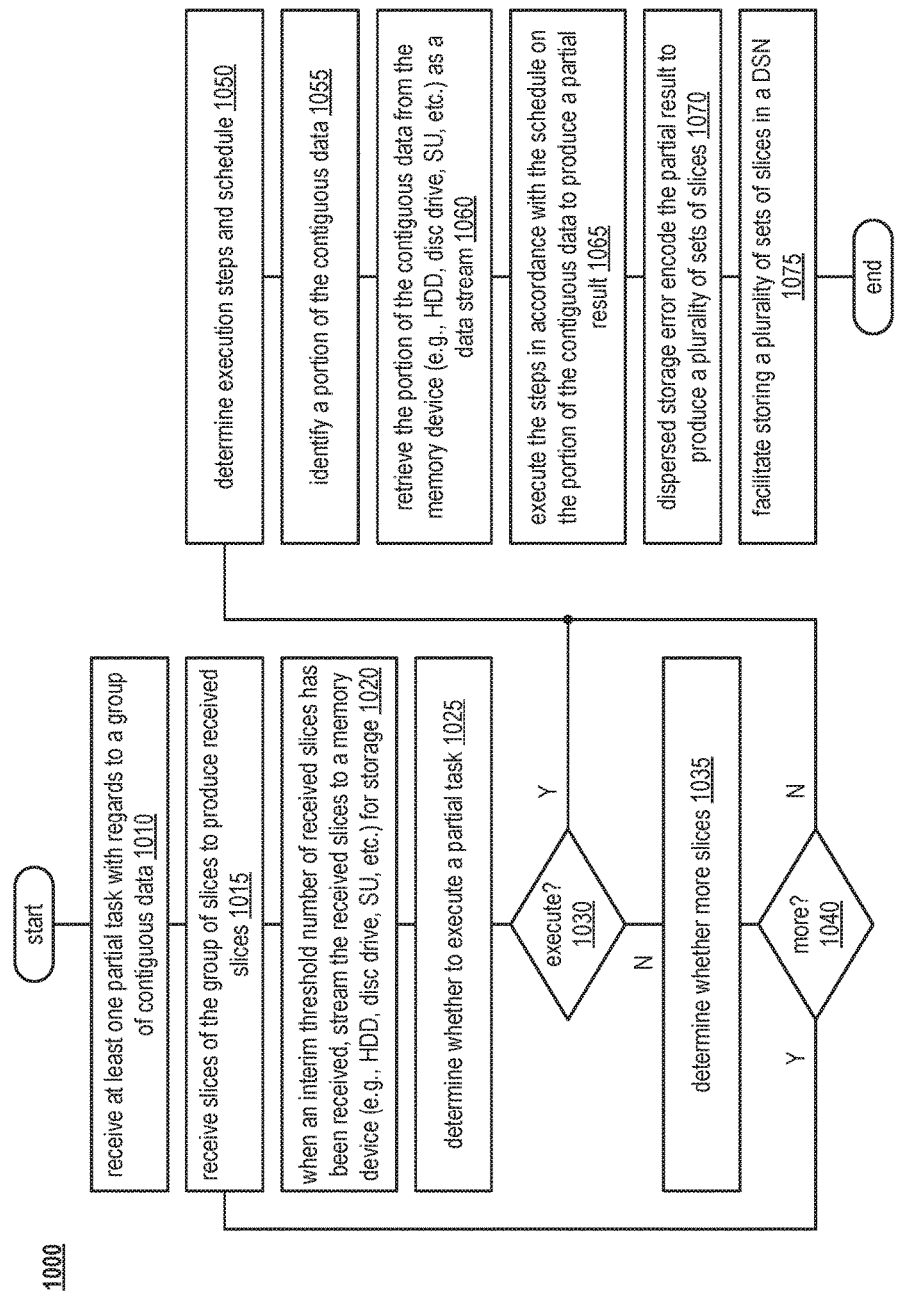
FIG. 10 is a flowchart illustrating an example of storing and processing a group of slices.

FIG. 10 is a flowchart illustrating an example of storing and processing a group of slices. The method 1000 begins with a step 1010 where a processing module (e.g., of a distributed task (DT) execution module of a distributed storage and task execution (DST EX) unit embedded within a disk drive unit) receives at least one partial task with regards to a group of slices of contiguous data (e.g., from a DST client module). The method 1000 continues at the step 1015 where the processing module receives slices of the group of slices to produce received slices. The method 1000 continues at the step 1020 where, when an interim threshold number (e.g., a maximum number of bytes limited by an ingestion cache memory) of received slices has been received, the processing module streams the received slices to a memory device for storage therein. Note that the memory device may be any type of memory device including any one or more of a hard disk drive (HDD), a disc drive, a storage unit (SU), etc. as desired in various examples and embodiments. The streaming may provide a write bandwidth system improvement for the group of slices (e.g., as the group of slices pertain to the contiguous data).

The method 1000 continues at the step 1025 (and step 1030) where the processing module determines whether to execute a partial task. The determination may be based on one or more of comparing an amount of data received to a data threshold, a partial task type, task execution resource availability, and a task schedule. For example, the processing module determines to execute the partial task when data of the received slices can be processed in accordance with a partial task. The method 1000 branches to the step 1050 where the processing module determines execution steps and schedule when the processing module determines to execute the partial task. The method 1000 continues to the next step 1035 when the processing module determines not to execute the partial task.

The method 1000 continues at the next step 1035 where the processing module determines whether more slices are expected. The determination may be based on one or more of a contiguous data size indicator, a query, a lookup, and a number of bytes received so far. The method 1000 repeats back to the step 1015 where the processing module receives slices of the group of slices to produce received slices when the processing module determines that there are more slices. The method 1000 continues to the next step 1050 when the processing module determines that there are no more slices.

The method 1000 continues at the next step 1050 where the processing module determines execution steps and schedule. The determination may be based on one or more of the at least one partial task, the data, a previous task schedule, a schedule template, a task execution resource availability level, and a task execution requirement. The method 1000 continues at the step 1055 where the processing module identifies a portion of the contiguous data for execution of one or steps of the execution steps. The identifying includes matching the portion of the contiguous data to the one or more steps of execution steps based on one or more of a data type indicator associated with the portion, a data type associated with or more steps, and a data available indicator.

The method 1000 continues at the step 1060 where the processing module retrieves the portion of the contiguous data from the memory device as a data stream. Again, note that the memory device may be any type of memory device including any one or more of a HDD, a disc drive, a SU, etc. as desired in various examples and embodiments. The retrieving includes accessing the disk drive for multiple contiguous data bytes. The streaming may provide a read bandwidth system improvement for the portion of data. The method 1000 continues at the step 1065 where the processing module executes the steps in accordance with the schedule on the portion of the contiguous data to produce a partial result. For example, the processing module executes a search partial task on the portion to produce a search partial result.

The method 1000 continues at the step 1070 where the processing module dispersed storage error encodes the partial results produce a plurality of sets of slices in accordance with dispersal parameters associated with one or more of the group of slices and the at least one partial task. The method 1000 continues at the step 1075 where the processing module facilitates storing a plurality of sets of slices in a dispersed or distributed storage network (DSN). For example, the processing module sends groups of slices to a DST EX unit, wherein the slices are of a common pillar number when a storage method 1000 indicates dispersed storage. As another example, the processing module sends groups of slices to a DST EX unit, wherein the slices are of two or more pillar number when a storage method 1000 indicates distributed task storage to enable subsequent task execution on the partial result. In addition, the processing module may receive more slices for more execution steps.

Figure 11:
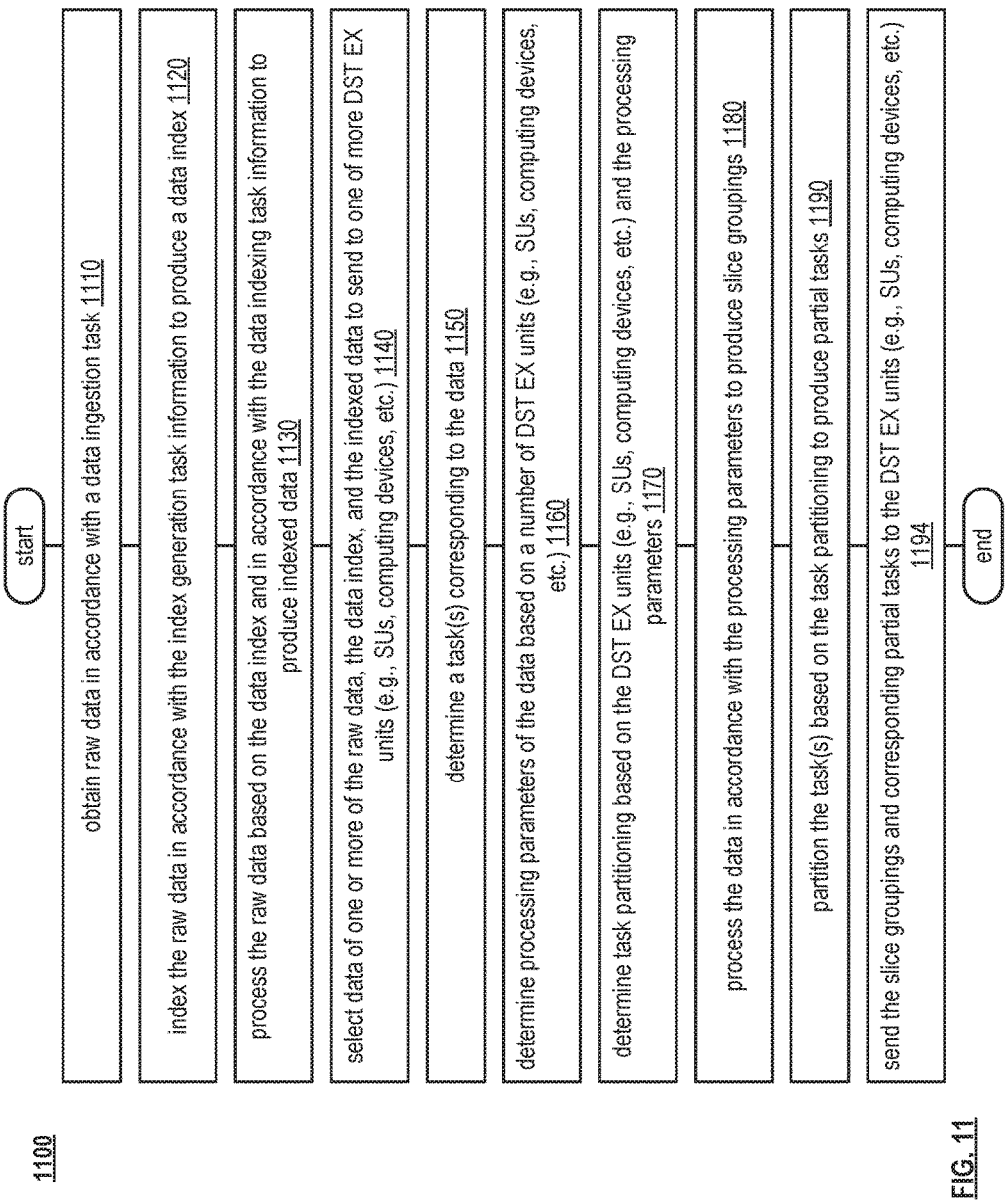
FIG. 11 is a flowchart illustrating an example of ingesting data in accordance with the invention.

FIG. 11 is a flowchart illustrating an example of ingesting data that includes similar steps to FIG. 9. The method 1100 begins with the step 1110 where a processing module (e.g., of a distributed storage and task (DST) execution unit, which may be a SU, computing device, etc.) obtains raw data in accordance with the data ingestion task. The data ingestion task may include one or more of a task type indicator (e.g., search, count, summarize, compress, perform a pattern recognition, etc.), search parameters, a pattern parameter, a dispersed or distributed storage network (DSN) address, a raw data identifier, a raw data source identifier, a task time limit, and additional execution resource identifiers. The data ingestion task may be obtained by one or more of receiving the task, generating the task based on a previous data analysis, and generating the task based on a trigger detection of previous raw data ingestion.

The method 1100 continues at the step 1120 where the processing module indexes the raw data in accordance with index generation task information to produce a data index. For example, the processing module searches the raw data for a keyword of apartment when the data ingestion task includes a search parameter for the keyword apartment. The method 1100 continues at the step 1130 where the processing module processes the raw data based on the data index in accordance with data indexing task information to produce indexed data. For example, the processing module extracts the portion of the raw data that is associated with the data index and that compares favorably to the data indexing task information.

The method 1100 continues at the step 1140 where the processing module selects data of one or more of the raw data, the data index, and the indexed data to send to one or more DST execution units (e.g., SUs, computing devices, etc.). The selecting may be based on one or more of a request, a storage capacity indicator, an estimated retrieval frequency, a reliability requirement, and a further processing requirement. For example, the processing module selects the indexed data to send to the one or more DST execution units (e.g., SUs, computing devices, etc.) when the processing module determines to further process the indexed data. The method 1100 continues at the step 1150 where the processing module determines a task corresponding to the data. For example, the processing module determines the task to be a storage task when the processing module determines to store the data index in the one or more DST execution units (e.g., SUs, computing devices, etc.). As another example, the processing module determines the task to be a data analysis task when the processing module determines to further process the indexed data by the one or more DST execution units.

The method 1100 continues with the steps of FIG. 9 where the processing module determines processing parameters of the data based on a number of DST execution units (e.g., SUs, computing devices, etc.) (step 1160), determines task partitioning based on the DST execution units (e.g., SUs, computing devices, etc.) and the processing parameters (step 1170), processes the data in accordance with the processing parameters to produce slice groupings (step 1180), partitions the task based on the task partitioning to produce partial tasks (step 1190), and sends the slice groupings and corresponding partial tasks to the DST execution units (e.g., SUs, computing devices, etc.) (step 1194).

Figure 12:
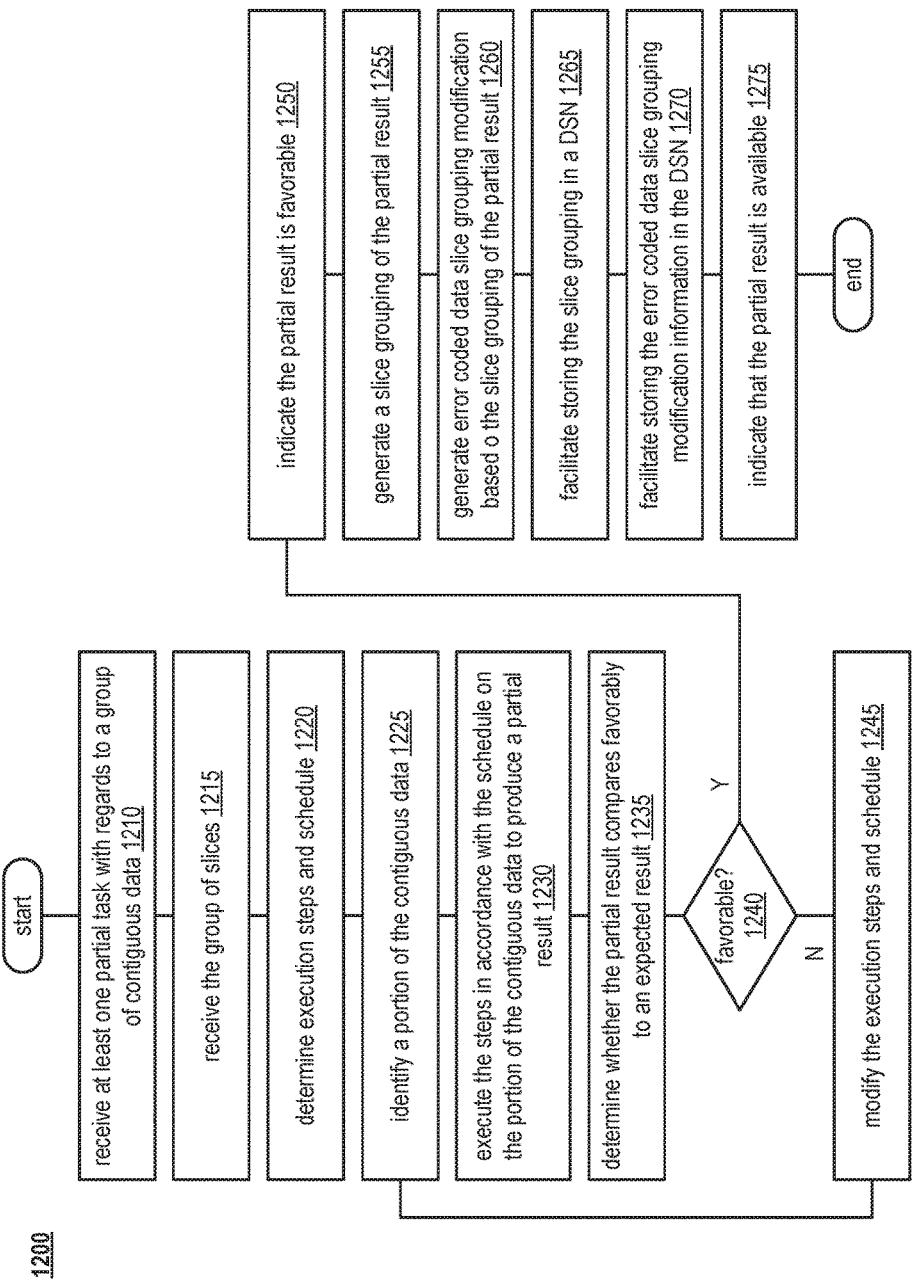
FIG. 12 is a flowchart illustrating an example of processing a threshold computing task in accordance with the invention.

FIG. 12 is a flowchart illustrating an example of processing a threshold computing task, which includes similar steps to FIG. 10. The method 1200 begins with the step 1210 where a processing module (e.g., of a distributed storage and task (DST) execution unit, which may be a SU, computing device, etc.) receives at least one partial task with regards to a group of slices of contiguous data. The method 1200 continues at the step 1215 where the processing module receives the group of slices. The method 1200 continues with similar steps of FIG. 10 where the processing module determines execution steps of schedule in step 1220, identifies a portion of the contiguous data in step 1225, and executes the steps in accordance with the schedule on the portion of the contiguous data to produce a partial result in step 1230.

The method 1200 continues at the step 1240 where the processing module determines whether the partial result compares favorably to an expected result. The expected result includes one or more of a result was produced, the result was produced without computing errors (e.g., no divide by zero, etc.), the result is within a predetermined favorable range of results, and a result type of the result is of a predetermined result type. The method 1200 branches to the step 1250 where the processing module indicates that the partial result is favorable when processing module determines that the partial result compares favorably to the expected result. The method 1200 continues to the next step 1245 when the processing module determines that the partial result compares unfavorably to the expected result. The method 1200 continues at the next step 1245 where the processing module modifies the execution steps and schedule. The modifying includes one or more of establishing updated steps and/or schedule to address an unfavorable nature of the partial result. The method 1200 loops back to the step 1225 where the processing module identifies the portion of the contiguous data. Alternatively, the process may end when reaching a limit of a number of loops and/or receiving a cancel request.

The method 1200 continues at the step 1250 where the processing module indicates that the partial result is favorable when the processing module determines that the partial result compares favorably to the expected result. For example, the processing module sends a result status to a requesting entity that includes an indication that the partial result is favorable. The method 1200 continues at the step 1255 where the processing module generates a slice grouping of the partial result. The method 1200 continues at the step 1260 where the processing module generates error coded data slice groupings modification information based on the slice groupings of the partial result. The generating may be based on one or more of a number of participating pillars, the slice grouping, a previous slice grouping of the partial result, an encoding matrix, an error coded data pillar number, and a zero information gain slice building approach. Such a zero information gain slice rebuilding approach is discussed in greater detail with reference to parent application related materials incorporated by reference herein above.

The method 1200 continues at step 1265 for the processing module facilitates storing the slice grouping in the DSN. For example, the processing module stores the slice grouping in a memory associated with a local (e.g., present) DST execution unit (e.g., SU, computing device, etc.). The method 1200 continues at the step 1270 where the processing module facilitates storing the error coded data slice grouping defecation information in the DSN. For example, the processing module sends a first error coded data slice grouping modification information to a first DST execution unit (e.g., SU, computing device, etc.) and a second error coded data slice grouping modification information to a second DST execution unit (e.g., SU, computing device, etc.), wherein the first and second DST execution units (e.g., SUs, computing devices, etc.) store error coded data slices corresponding to the slice grouping. The method 1200 continues at the step 1275 where the processing module indicates that the partial result is available. For example, the processing module sends a result status to the requesting entity that includes an indication that the partial result is available (e.g., available in the DSN for retrieval).

Figure 13:
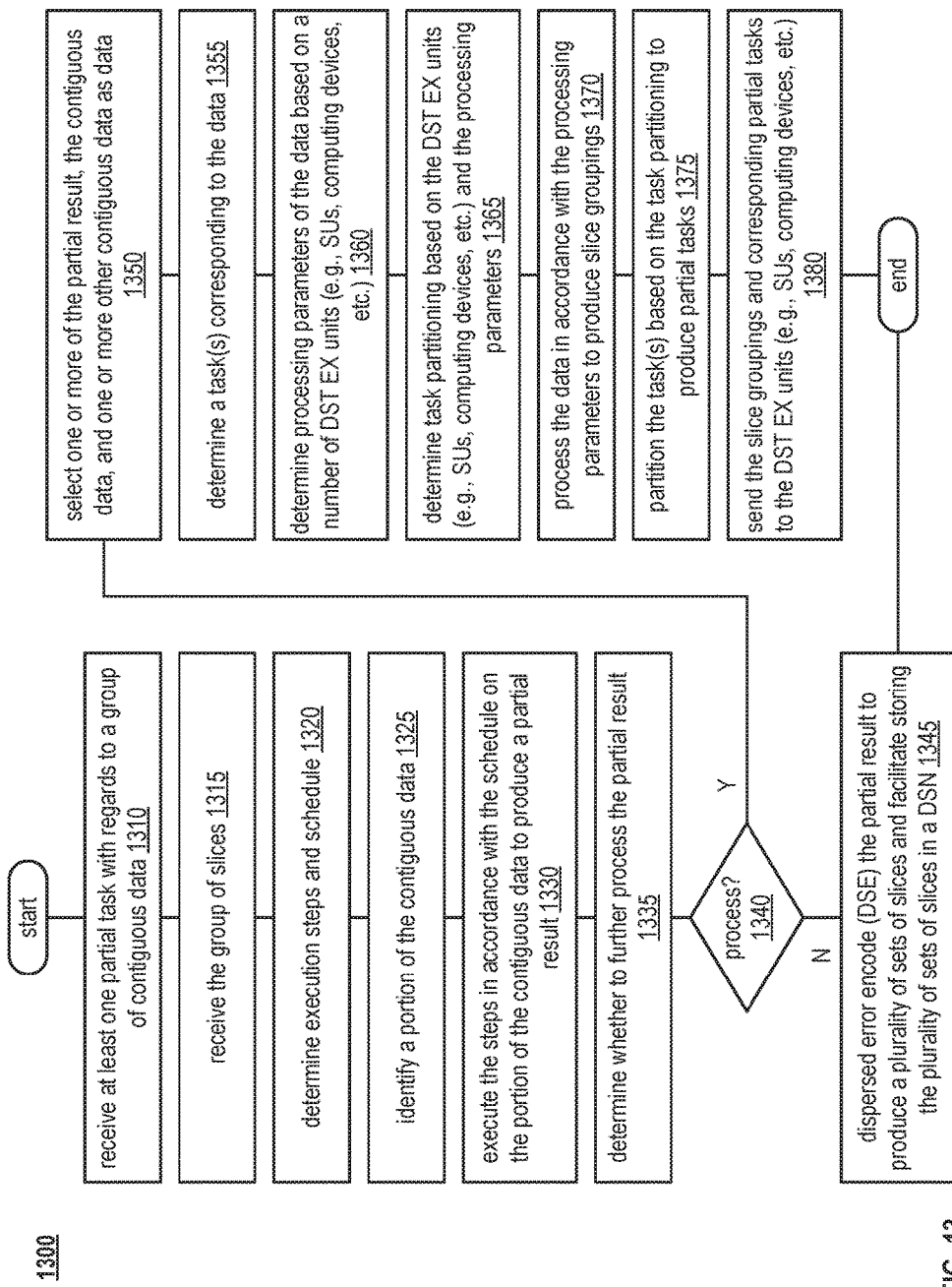
FIG. 13 is a flowchart illustrating an example of further processing of a group of slices in accordance with the invention.

FIG. 13 is a flowchart illustrating an example of further processing of a group of slices, which includes similar steps to FIGS. 9, 10, 11, and 12. The method 1300 begins with the step 1310 where a processing module (e.g., of a distributed storage and task (DST) execution unit, which may be a SU, computing device, etc.) receives at least one partial task with regards to a group of slices of contiguous data and continues with the step 1315 where the processing module receives the group of slices. The method 1300 continues with the steps where the processing module determines execution steps and schedule (1320), identifies a portion of the contiguous data (1325), and executes the steps in accordance with the schedule on the portion of the contiguous data to produce a partial result (1330).

The method 1300 continues at the step 1335 where the processing module determines whether to further process the partial result. The determining may be based on one or more of comparing the partial result to a partial result threshold with regards to one or more aspects of the partial result. For example, the processing module determines to further process the partial result when the partial result does not include a keyword search aspect. The method 1300 continues to the next step 1350 when the processing module determines to perform further processing in step 1340. The method 1300 branches to the step 1350 where the processing module selects one or more of the partial result, the contiguous data, and one or more other contiguous data as data when the processing module determines to further process the partial result. The method 1300 continues to the next step 1345 when the processing module determines to not further process the partial result in step 1340. The method 1300 continues at the next step 1345 with the steps where the processing module dispersed storage error encodes the partial result to produce a plurality of sets of slices and facilitate storing the plurality of sets of slices in a dispersed or distributed storage network (DSN).

The method 1300 continues at the step 1350 where the processing module selects one or more of the partial result, the contiguous data, and one or more other contiguous data as data. The selecting is based on the partial result, a partial result threshold, a comparison of the partial result of the partial result threshold, an aspect of the partial result, a trigger associated with the aspect of the partial result, and a comparison of the aspect of the partial result with the trigger associated with the aspect of the partial result. The selecting enables for the processing including processing the partial result further with a current task, processing the contiguous data with new tasks, and/or activating additional DST execution units (e.g., SUs, computing devices, etc.) to reprocess corresponding grouping of slices with new tasks. The method 1300 continues with the step 1355 where the processing module determines a task corresponding to the data and continues with the step 1360 where the processing module determines processing parameters of the data based on a number of DST execution units (e.g., SUs, computing devices, etc.) and in the step 1365 determines task partitioning based on the DST execution units (e.g., SUs, computing devices, etc.) and the processing parameters.

The method 1300 continues at the step 1370 where the processing module processes the data in accordance with the processing parameters to produce slice groupings to align each slice grouping with a corresponding DST execution unit (e.g., SU, computing device, etc.). The method 1300 continues with the step 1375 where the processing module partitions the test based on the task partitioning to produce partial tasks. The method 1300 continues at the step 1380 where the processing module sends the slice groupings of the corresponding partial tasks to the DST execution units (e.g., SUs, computing devices, etc.). For example, the processing module sends slice groupings when sending the partial result and/or the contiguous data.

FIG. 14 is a diagram illustrating an embodiment of a method 1400 for execution by one or more computing devices in accordance with the present invention. The method 1400 operates in step 1410 by receiving (e.g., via an interface of the computing device that is configured to interface and communicate with a dispersed or distributed storage network (DSN)) distributed computing data. The method 1400 operates in step 1420 by receiving (e.g., via the interface of the computing device) a distributed computing request that includes a trigger pattern.

The method 1400 operates in step 1430 by identifying a portion of the distributed computing data. The method 1400 operates in step 1440 by executing a distributed computing task on the portion of the distributed computing data based on the distributed computing request to generate a partial result. The method 1400 operates in step 1450 by determining whether the partial result compares favorably to the trigger pattern of the distributed computing request.

When the partial result compares favorably to the trigger pattern of the distributed computing request (branching from step 1460), the method 1400 operates in step 1470 by dispersed error encoding the partial result to generate sets of encoded data slices (EDSs) to be stored within a plurality of storage units (SUs) of the DSN.

Alternatively, when the partial result compares unfavorably to the trigger pattern of the distributed computing request (branching from step 1460), the method 1400 operates in step 1480 by facilitating execution of at least one other distributed computing task on the partial result, the portion of the distributed computing data, and/or another portion of the distributed computing data via the DSN.

In some examples, when the partial result compares favorably to the trigger pattern of the distributed computing request, the method 1400 also operates by segmenting the partial result to generate a plurality of partial result segments, dispersed error encoding the plurality of partial result segments to generate sets of EDSs, and distributedly storing the sets of EDSs within the plurality of SUs of the DSN. Note that a decode threshold number of EDSs are needed to recover a partial result segment of the plurality of partial result segments, and a read threshold number of EDSs provides for reconstruction of the partial result segment of the plurality of partial result segments. Also, a write threshold number of EDSs provides for a successful transfer of a set of the sets of the EDSs from a first at least one location in the DSN to a second at least one location in the DSN.

In even other examples, when the partial result compares favorably to the trigger pattern of the distributed computing request, the method 1400 operates by determining the at least one other distributed computing task. The method 1400 then operates by determining processing parameters of the partial result, the portion of the distributed computing data, and/or another portion of the distributed computing data based on a number of a plurality of other computing devices to perform execution of at least one other distributed computing task on the partial result, the portion of the distributed computing data, and/or another portion of the distributed computing data. The method 1400 then operates by determining task partitioning based on the plurality of other computing devices and the processing parameters. The method 1400 then operates by processing the partial result, the portion of the distributed computing data, and/or another portion of the distributed computing data based on processing parameters to generate data slice groupings. The method 1400 then operates by partitioning the at least one other distributed computing task based on the task partitioning to generate partial tasks. Then, the method 1400 then operates by transmitting (e.g., via the interface of the computing device) the partial tasks and the data slice groupings respectively to the plurality of other computing devices to be executed respectively by the plurality of other computing devices to generate a plurality of processed partial results. In some examples, each respective one of the plurality of other computing devices operates to perform a respective one of the partial tasks to generate a respective one of the plurality of processed partial results.

In some examples, when the partial result compares unfavorably to the trigger pattern of the distributed computing request, the method 1400 operates by selecting the at least one other distributed computing task on the partial result, the portion of the distributed computing data, and/or another portion of the distributed computing data based on the partial result, a partial result threshold, a comparison of the partial result of the partial result threshold, an aspect of the partial result, a trigger associated with the aspect of the partial result, and/or a comparison of the aspect of the partial result with the trigger associated with the aspect of the partial result.

In even other examples, the method 1400 operates by determining whether the partial result compares favorably to the trigger pattern of the distributed computing request by comparing the partial result to a partial result threshold and/or determining whether the partial result includes a keyword search aspect.

This disclosure presents, among other things, a distributed computing module (e.g., implemented using one or more of a DST execution unit, a computing device, a SU, etc.) that retrieves or receives distributed computing data (e.g., slices that contain a portion of data for processing) and a distributed computing request. This may be retrieved or received from a portion of a shared memory within the DSN. The distributed computing module then executes distributed computing task(s) on the data portion based on the request to produce new distributed computing data and stores the new distributed computing data (e.g., in the portion of the memory). The distributed computing module then determines whether a trigger has occurred. This determination may be performed based on comparing the new distributed computing data (e.g., a partial result generated by processing the distributed computing task(s) on the data portion) to a trigger pattern of the request. Then, the distributed computing module generates a trigger summary that associates triggers with the data and stores the trigger summary (e.g., in the shared memory to share it without other distributed computing modules, computing devices, SUs, etc.). The distributed computing module then facilitates initiation of one or more new distributed computing tasks based on whether the trigger has occurred (e.g., initiate analysis of different data utilizing the same trigger, initiate a subsequent analysis on the data utilizing a new trigger, generating a request for another distributed computing module). The distributed computing module then makes the new distributed computing data visible as part of a dispersed storage network (DSN).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   a processing module operably coupled to the interface and to the memory, wherein the processing module, when operable within the computing device based on the operational instructions, is configured to:
      receive distributed computing data via the DSN;
      receive a distributed computing request that includes a trigger pattern via the DSN;

identify a portion of the distributed computing data;
execute a distributed computing task on the portion of the distributed computing data based on the distributed computing request to generate a partial result;
determine whether the partial result compares favorably to the trigger pattern of the distributed computing request;
when the partial result compares favorably to the trigger pattern of the distributed computing request, dispersed error encode (DSE) the partial result to generate sets of encoded data slices (EDSs) to be stored within a plurality of storage units (SUs) of the DSN; and
when the partial result compares unfavorably to the trigger pattern of the distributed computing request, facilitate execution of at least one other distributed computing task on at least one of the partial result, the portion of the distributed computing data, or another portion of the distributed computing data via the DSN.

2. The computing device of claim 1, wherein the processing module, when operable within the computing device based on the operational instructions, is further configured, when the partial result compares favorably to the trigger pattern of the distributed computing request, to:
segment the partial result to generate a plurality of partial result segments;
DSE the plurality of partial result segments to generate sets of EDSs; and
distributedly store the sets of EDSs within the plurality of SUs of the DSN, wherein a decode threshold number of EDSs are needed to recover a partial result segment of the plurality of partial result segments, wherein a read threshold number of EDSs provides for reconstruction of the partial result segment of the plurality of partial result segments, and wherein a write threshold number of EDSs provides for a successful transfer of a set of the sets of the EDSs from a first at least one location in the DSN to a second at least one location in the DSN.

3. The computing device of claim 1, wherein the processing module, when operable within the computing device based on the operational instructions, is further configured, when the partial result compares unfavorably to the trigger pattern of the distributed computing request, to:
determine the at least one other distributed computing task;
determine processing parameters of the at least one of the partial result, the portion of the distributed computing data, or another portion of the distributed computing data based on a number of a plurality of other computing devices to perform execution of at least one other distributed computing task on at least one of the partial result, the portion of the distributed computing data, or another portion of the distributed computing data;
determine task partitioning based on the plurality of other computing devices and the processing parameters;
process the at least one of the partial result, the portion of the distributed computing data, or another portion of the distributed computing data based on processing parameters to generate data slice groupings;
partition the at least one other distributed computing task based on the task partitioning to generate partial tasks; and
transmit the partial tasks and the data slice groupings respectively to the plurality of other computing devices to be executed respectively by the plurality of other computing devices to generate a plurality of processed partial results.

4. The computing device of claim 1, wherein the processing module, when operable within the computing device based on the operational instructions, is further configured, when the partial result compares unfavorably to the trigger pattern of the distributed computing request, to:
select the at least one other distributed computing task on at least one of the partial result, the portion of the distributed computing data, or another portion of the distributed computing data based on at least one of the partial result, a partial result threshold, a comparison of the partial result of the partial result threshold, an aspect of the partial result, a trigger associated with the aspect of the partial result, or a comparison of the aspect of the partial result with the trigger associated with the aspect of the partial result.

5. The computing device of claim 1, wherein the processing module, when operable within the computing device based on the operational instructions, is further configured to:
determine whether the partial result compares favorably to the trigger pattern of the distributed computing request by at least one of comparing the partial result to a partial result threshold or determining whether the partial result includes a keyword search aspect.

6. The computing device of claim 1, wherein the computing device is located at a first premises that is remotely located from at least one SU of the plurality of SUs within the DSN.

7. The computing device of claim 1 further comprising:
a SU of the plurality of SUs within the DSN, a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:
an interface configured to interface and communicate with a dispersed or distributed storage network (DSN);
memory that stores operational instructions; and
a processing module operably coupled to the interface and to the memory, wherein the processing module, when operable within the computing device based on the operational instructions, is configured to:
receive distributed computing data via the DSN;
receive a distributed computing request that includes a trigger pattern via the DSN;
identify a portion of the distributed computing data;
execute a distributed computing task on the portion of the distributed computing data based on the distributed computing request to generate a partial result;
determine whether the partial result compares favorably to the trigger pattern of the distributed computing request by at least one of comparing the partial result to a partial result threshold or determining whether the partial result includes a keyword search aspect;
when the partial result compares favorably to the trigger pattern of the distributed computing request, dispersed error encode (DSE) the partial result to generate sets of encoded data slices (EDSs) to be stored within a plurality of storage units (SUs) of the DSN including to:

segment the partial result to generate a plurality of partial result segments;

DSE the plurality of partial result segments to generate sets of EDSs; and distributedly store the sets of EDSs within the plurality of SUs of the DSN, wherein a decode threshold number of EDSs are needed to recover a partial result segment of the plurality of partial result segments, wherein a read threshold number of EDSs provides for reconstruction of the partial result segment of the plurality of partial result segments, and wherein a write threshold number of EDSs provides for a successful transfer of a set of the sets of the EDSs from a first at least one location in the DSN to a second at least one location in the DSN; and when the partial result compares unfavorably to the trigger pattern of the distributed computing request, facilitate execution of at least one other distributed computing task on at least one of the partial result, the portion of the distributed computing data, or another portion of the distributed computing data via the DSN.

10. The computing device of claim 9, wherein the processing module, when operable within the computing device based on the operational instructions, is further configured, when the partial result compares unfavorably to the trigger pattern of the distributed computing request, to:

determine the at least one other distributed computing task;

determine processing parameters of the at least one of the partial result, the portion of the distributed computing data, or another portion of the distributed computing data based on a number of a plurality of other computing devices to perform execution of at least one other distributed computing task on at least one of the partial result, the portion of the distributed computing data, or another portion of the distributed computing data;

determine task partitioning based on the plurality of other computing devices and the processing parameters;

process the at least one of the partial result, the portion of the distributed computing data, or another portion of the distributed computing data based on processing parameters to generate data slice groupings;

partition the at least one other distributed computing task based on the task partitioning to generate partial tasks; and transmit the partial tasks and the data slice groupings respectively to the plurality of other computing devices to be executed respectively by the plurality of other computing devices to generate a plurality of processed partial results.

11. The computing device of claim 9, wherein the processing module, when operable within the computing device based on the operational instructions, is further configured, when the partial result compares unfavorably to the trigger pattern of the distributed computing request, to:

select the at least one other distributed computing task on at least one of the partial result, the portion of the distributed computing data, or another portion of the distributed computing data based on at least one of the partial result, a partial result threshold, a comparison of the partial result of the partial result threshold, an aspect of the partial result, a trigger associated with the aspect of the partial result, or a comparison of the aspect of the partial result with the trigger associated with the aspect of the partial result.

12. The computing device of claim 9 further comprising:

a SU of the plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication system, a non-public intranet system, a public internet system, a local area network (LAN), or a wide area network (WAN).

14. A method for execution by a computing device, the method comprising:

receiving, via an interface of the computing device that is configured to interface and communicate with a dispersed or distributed storage network (DSN), distributed computing data;

receiving, via the interface of the computing device, a distributed computing request that includes a trigger pattern;

identifying a portion of the distributed computing data;

executing a distributed computing task on the portion of the distributed computing data based on the distributed computing request to generate a partial result;

determining whether the partial result compares favorably to the trigger pattern of the distributed computing request;

when the partial result compares favorably to the trigger pattern of the distributed computing request, dispersed error encoding the partial result to generate sets of encoded data slices (EDSs) to be stored within a plurality of storage units (SUs) of the DSN; and when the partial result compares unfavorably to the trigger pattern of the distributed computing request, facilitating execution of at least one other distributed computing task on at least one of the partial result, the portion of the distributed computing data, or another portion of the distributed computing data via the DSN.

15. The method of claim 14, when the partial result compares favorably to the trigger pattern of the distributed computing request, further comprising:

segmenting the partial result to generate a plurality of partial result segments;

dispersed error encoding the plurality of partial result segments to generate sets of EDSs; and distributedly storing the sets of EDSs within the plurality of SUs of the DSN, wherein a decode threshold number of EDSs are needed to recover a partial result segment of the plurality of partial result segments, wherein a read threshold number of EDSs provides for reconstruction of the partial result segment of the plurality of partial result segments, and wherein a write threshold number of EDSs provides for a successful transfer of a set of the sets of the EDSs from a first at least one location in the DSN to a second at least one location in the DSN.

16. The method of claim 14, when the partial result compares favorably to the trigger pattern of the distributed computing request, further comprising:

determining the at least one other distributed computing task;

determining processing parameters of the at least one of the partial result, the portion of the distributed computing data, or another portion of the distributed computing data based on a number of a plurality of other computing devices to perform execution of at least one other distributed computing task on at least one of the partial result, the portion of the distributed computing data, or another portion of the distributed computing data;

determining task partitioning based on the plurality of other computing devices and the processing parameters;

processing the at least one of the partial result, the portion of the distributed computing data, or another portion of the distributed computing data based on processing parameters to generate data slice groupings;

partitioning the at least one other distributed computing task based on the task partitioning to generate partial tasks; and transmitting, via the interface of the computing device, the partial tasks and the data slice groupings respectively to the plurality of other computing devices to be executed respectively by the plurality of other computing devices to generate a plurality of processed partial results.

17. The method of claim 14, when the partial result compares unfavorably to the trigger pattern of the distributed computing request, further comprising:

selecting the at least one other distributed computing task on at least one of the partial result, the portion of the distributed computing data, or another portion of the distributed computing data based on at least one of the partial result, a partial result threshold, a comparison of the partial result of the partial result threshold, an aspect of the partial result, a trigger associated with the aspect of the partial result, or a comparison of the aspect of the partial result with the trigger associated with the aspect of the partial result.

18. The method of claim 14 further comprising:

determining whether the partial result compares favorably to the trigger pattern of the distributed computing request by at least one of comparing the partial result to a partial result threshold or determining whether the partial result includes a keyword search aspect.

19. The method of claim 14, wherein the computing device is a SU of the plurality of SUs within the DSN, a wireless smart phone, a laptop, a tablet, a personal computers (PC), a work station, or a video game device.

20. The method of claim 14, wherein the DSN includes at least one of a wireless communication system, a wire lined communication system, a non-public intranet system, a public internet system, a local area network (LAN), or a wide area network (WAN).

* * * * *